United States Patent
Sekiyama et al.

(10) Patent No.: US 9,755,464 B2
(45) Date of Patent: Sep. 5, 2017

(54) ROTOR FOR AUTOMOTIVE ALTERNATOR

(71) Applicant: DENSO CORPORATION, Kariya, Aichi-pref. (JP)

(72) Inventors: Yosuke Sekiyama, Toyoake (JP); Nobuhiro Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 638 days.

(21) Appl. No.: 14/099,182

(22) Filed: Dec. 6, 2013

(65) Prior Publication Data
US 2014/0175939 A1   Jun. 26, 2014

(30) Foreign Application Priority Data

Dec. 25, 2012   (JP) .................................. 2012-280432

(51) Int. Cl.
*H02K 1/24*   (2006.01)

(52) U.S. Cl.
CPC .................... *H02K 1/243* (2013.01)

(58) Field of Classification Search
CPC .......... H02K 1/22; H02K 19/22; H02K 19/16; H02K 9/04; H02K 9/06
USPC ........................................................ 310/263
See application file for complete search history.

(56) References Cited

U.S. PATENT DOCUMENTS

| | | | |
|---|---|---|---|
| 4,972,114 A | 11/1990 | Frister | |
| 5,708,318 A | 1/1998 | Fudono | |
| 6,114,793 A * | 9/2000 | Asao | H02K 1/243 310/263 |
| 6,472,793 B2 * | 10/2002 | Asao | H02K 19/22 310/254.1 |
| 6,476,535 B1 * | 11/2002 | Oohashi | H02K 1/243 310/263 |
| 6,522,045 B2 * | 2/2003 | Ikeda | H02K 1/243 310/261.1 |

(Continued)

FOREIGN PATENT DOCUMENTS

| | | |
|---|---|---|
| JP | S51-087705 A | 7/1976 |
| JP | S60-98854 A | 6/1985 |

(Continued)

OTHER PUBLICATIONS

Dec. 5, 2014 Office Action issued in Japanese Aplication No. 2012-280432.

(Continued)

*Primary Examiner* — Tran Nguyen
(74) *Attorney, Agent, or Firm* — Oliff PLC (57) ABSTRACT

A rotor includes a rotating shaft and a pair of first and second pole cores fixed on the rotating shaft. Each of the first and second pole cores includes a plurality of magnetic pole claws each having a root portion and a distal end. Each of the magnetic pole claws are configured to have a constant circumferential width at the root portion and taper from the root portion to the distal end. The magnetic pole claws of the first pole core are arranged alternately with those of the second pole core in a circumferential direction of the rotating shaft. Further, at least part of the magnetic pole claws of the first and second pole cores each have at least one chamfered portion formed at a circumferential end of the root portion of the magnetic pole claw so as to extend parallel to an axial direction of the rotating shaft.

8 Claims, 6 Drawing Sheets

(56) References Cited

U.S. PATENT DOCUMENTS

| | | | |
|---|---|---|---|
| 7,679,259 B2* | 3/2010 | Lutz | H02K 1/243 310/156.66 |
| 2002/0021052 A1* | 2/2002 | Asao | H02K 19/22 310/263 |
| 2009/0085417 A1* | 4/2009 | Vasilescu | F04D 29/667 310/62 |

FOREIGN PATENT DOCUMENTS

| | | |
|---|---|---|
| JP | H02-501973 A | 6/1990 |
| JP | H03-203537 A | 9/1991 |
| JP | H09-215288 A | 8/1997 |
| JP | 2002-058220 A | 2/2002 |
| JP | A-2002-354720 | 12/2002 |

OTHER PUBLICATIONS

Aug. 4, 2015 Office Action issued in Japanese Patent Application No. 2012-280432.

* cited by examiner

FIG.1

FRONT ←→ REAR
AXIAL DIRECTION

DIRECTION OF ROTATION

→ DIRECTION OF ROTATION

FIG.11

→ DIRECTION OF ROTATION

ROTOR FOR AUTOMOTIVE ALTERNATOR

CROSS-REFERENCE TO RELATED APPLICATION

This application is based on and claims priority from Japanese Patent Application No. 2012-280432, filed on Dec. 25, 2012, the content of which is hereby incorporated by reference in its entirety into this application.

BACKGROUND OF THE INVENTION

1. Technical Field of the Invention

The present invention relates to rotors for automotive alternators that are used in, for example, passenger cars and trucks.

2. Description of the Related Art

Japanese Unexamined Patent Application Publication No. 2002-354720, an English equivalent of which is U.S. Pat. No. 6,476,535 B1, discloses an automotive alternator. This alternator is designed to increase an output of the alternator by reducing leakage magnetic flux that flows between adjacent magnetic pole claws of a rotor via teeth of a stator core when the magnetic pole claws are at a predetermined relative position to the teeth of the stator core in the alternator.

Specifically, in the alternator, each of the magnetic pole claws of the rotor has a pair of chamfered portions formed respectively at opposite circumferential ends of a root shoulder part of the magnetic pole claw. Each of the chamfered portions is made up of a surface that includes: a point B on a line from which a taper formed on an outer peripheral surface of the root shoulder part starts; a point C on a skew slanted portion of the magnetic pole claw; and a point A on a circumferential end surface of the magnetic pole claw. Consequently, when the chamfered portions of the magnetic pole claws of the rotor are positioned so as to radially overlap distal ends of the teeth of the stator core, air gaps formed between the magnetic pole claws and the teeth of the stator core are increased by the chamfered portions in the overlapping regions. Further, with the increase in the air gaps, the magnetic reluctance between the magnetic pole claws and the teeth of the stator core is accordingly increased in the overlapping regions, thereby reducing the leakage magnetic flux that flows between the adjacent magnetic pole claws of the rotor via the teeth of the stator core. As a result, the effective magnetic flux in the alternator is accordingly increased, thereby increasing the output of the alternator.

However, in the above alternator, to reduce the leakage magnetic flux, it is necessary for the chamfered portions to exist on the magnetic flux path when the adjacent magnetic pole claws of the rotor radially overlap the distal ends of the teeth of the stator core. On the other hand, for each of the chamfered portions, the boundary line (i.e., the line connecting the points B and C) between the chamfered portion and the outer peripheral surface of the magnetic pole claw extends obliquely with respect to circumferential ends of the teeth of the stator core. Therefore, at those areas of the chamfered portion which are close to the boundary line, the radial distance between the magnetic pole claw and the teeth of the stator core is short. In contrast, at those areas of the chamfered portion which are distant from the boundary line, the radial distance between the magnetic pole claw and the teeth of the stator core is long. Consequently, when the radial distance is increased for reducing the leakage magnetic flux at those areas of the chamfered portion which are close to the boundary line, the radial distance may become excessively long at those areas of the chamfered portion which are distant from the boundary line, thereby reducing the effective magnetic flux. As a result, it may be difficult to achieve the desired effect of increasing the output of the alternator by reducing the leakage magnetic flux.

Moreover, with the above-described configuration of the chamfered portions, there still remains the problem that the chamfered portions function as a fan to generate wind noise during rotation of the rotor. In addition, it may be difficult to minimize the manufacturing cost of the alternator.

SUMMARY

According to an exemplary embodiment, a rotor for an automotive alternator is provided which includes a rotating shaft and a pair of first and second pole cores fixed on the rotating shaft. Each of the first and second pole cores includes a plurality of magnetic pole claws. Each of the magnetic pole claws has a root portion and a distal end. Each of the magnetic pole claws are configured to have a constant circumferential width at the root portion and taper from the root portion to the distal end. The magnetic pole claws of the first pole core are arranged alternately with the magnetic pole claws of the second pole core in a circumferential direction of the rotating shaft. Further, at least part of the magnetic pole claws of the first and second pole cores each have at least one chamfered portion formed at a circumferential end of the root portion of the magnetic pole claw so as to extend parallel to an axial direction of the rotating shaft.

With the above configuration, it is possible to increase the air gaps between the magnetic pole claws of the first and second pole cores and the teeth of a stator core of the alternator at those areas where leakage magnetic flux occurs, thereby reducing the leakage magnetic flux. At the same, it is also possible to suppress increase in the air gaps between the magnetic pole claws of the first and second pole cores and the teeth of the stator core at the other areas, thereby preventing the effective magnetic flux in the alternator from being reduced. As a result, it is possible to secure a high output of the alternator.

Moreover, with the above configuration, even when the axial length of the stator core is increased, it is still possible to reduce the leakage magnetic flux while preventing the effective magnetic flux from being reduced. Therefore, it is possible to meet a plurality of required outputs of the alternator only by increasing the axial length of the stator core, more specifically by increasing the number of steel sheets laminated for forming the stator core. Consequently, it is possible to suppress increase in the manufacturing cost of the alternator.

In a further implementation, all of the magnetic pole claws of the first and second pole cores each have a pair of chamfered portions formed respectively at opposite circumferential ends of the root portion of the magnetic pole claw so as to extend parallel to the axial direction of the rotating shaft. The chamfered portions of the magnetic pole claws of the first and second pole cores are formed so that when one of the teeth of the stator core is at a predetermined relative position to circumferentially-adjacent two of the magnetic pole claws of the first and second pole cores, for each of the two magnetic pole claws, the air gap between the chamfered portion of the magnetic pole claw and the tooth of the stator core increases in the circumferential direction toward the circumferential end of the root portion of the magnetic pole claw. Here, the predetermined relative position is such a relative position where the tooth of the stator core radially overlaps the two circumferentially-adjacent magnetic pole claws to have a maximum overlapping area therebetween. Further, at the predetermined relative position, the overlapping area between the tooth of the stator core and one of the two circumferentially-adjacent magnetic pole claws is equal to the overlapping area between the tooth and the other magnetic pole claw. Furthermore, at the predetermined relative position, for each of the two circumferentially-adjacent magnetic pole claws, a boundary between the chamfered portion of the magnetic pole claw and a radially outer surface of the magnetic pole claw is circumferentially located apart from the tooth of the stator core.

In the rotor, at least part of the chamfered portions of the magnetic pole claws of the first and second pole cores may be each made up of a curved surface.

Alternatively, at least part of the chamfered portions of the magnetic pole claws of the first and second pole cores may be each made up of a single flat surface.

Otherwise, at least part of the chamfered portions of the magnetic pole claws of the first and second pole cores may be each made up of a plurality of flat surfaces.

In the rotor, the at least part of the magnetic pole claws of the first and second pole cores may each have only one chamfered portion formed at that one of opposite circumferential ends of the root portion of the magnetic pole claw which is located on the rear side of the other circumferential end in the direction of rotation of the rotor.

Otherwise, the at least part of the magnetic pole claws of the first and second pole cores may each have a pair of chamfered portions formed respectively at opposite circumferential ends of the root portion of the magnetic pole claw. Further, in this case, for each of the at least part of the magnetic pole claws of the first and second pole cores, the chamfered portion formed at the circumferential end of the root portion of the magnetic pole claw on the front side in the direction of rotation of the alternator may be made up of a curved surface, and the chamfered portion formed at the circumferential end of the root portion on the rear side in the direction of rotation may be made up of a single flat surface or a plurality of flat surfaces.

In the rotor, each of the chamfered portions of the magnetic pole claws of the first and second pole cores is formed so that a boundary between the chamfered portion and a radially outer surface of the magnetic pole claw extends parallel to the axial direction of the rotating shaft.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
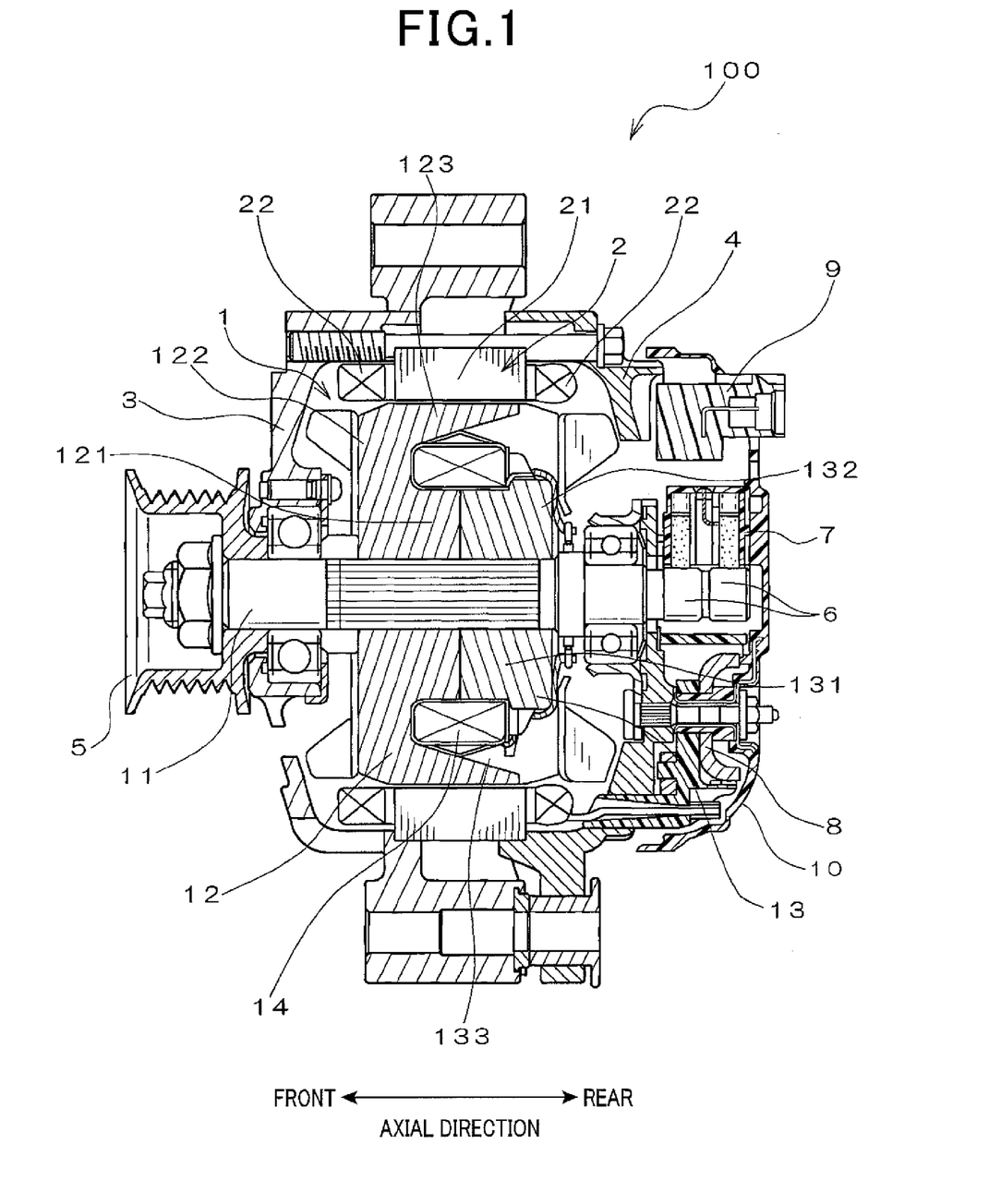
FIG. 1 is a cross-sectional view of an automotive alternator which includes a rotor according to an embodiment.

FIG. 1 shows the overall configuration of an automotive alternator 100 which includes a rotor 1 according to an exemplary embodiment. The alternator 100 is designed to be used in a motor vehicle, such as a passenger car or a truck.

As shown in FIG. 1, the alternator 100 includes, in addition to the rotor 1, a stator 2, a front housing 3, a rear housing 4, a pulley 5, a pair of slip rings 6, a brush assembly 7, a rectifier 8, a voltage regulator 9, and a rear cover 10.

The stator 2 is arranged radially outside of the rotor 1. More specifically, the stator 2 includes an annular stator core 21 that is disposed so as to surround the rotor 1 and a three-phase stator coil 22 wound around the stator core 21.

Figure 2:
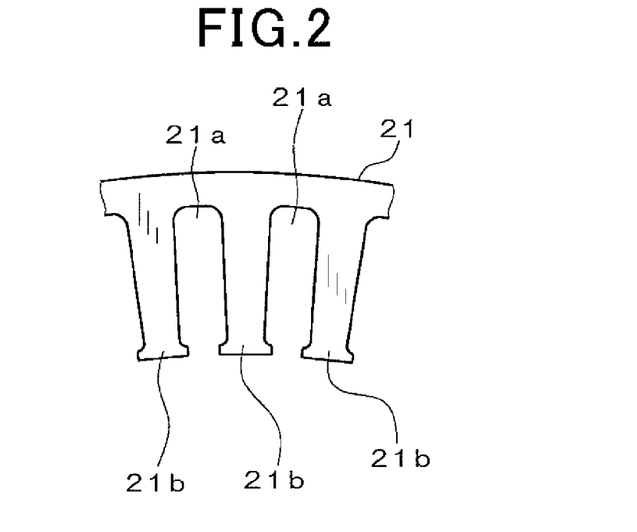
FIG. 2 is a plan view of part of a stator core of the alternator.

Moreover, as shown in FIG. 2, the stator core 21 has a plurality of slots 21a formed therein. The slots 21a are spaced from one another in the circumferential direction of the stator core 21 at predetermined intervals and open at the radially inner periphery of the stator core 21. The stator core 21 also has a plurality of teeth 21b, each of which is formed between one adjacent pair of the slots 21a. Accordingly, the teeth 21b are also spaced from one another in the circumferential direction of the stator core 21 at the predetermined intervals.

In addition, the stator core 21 is formed by laminating, in the axial direction of the stator core 21, a plurality of thin steel sheets which have a thickness of, for example, 0.5 mm. Therefore, it is possible to easily increase the axial length of the stator core 21 by increasing the number of the steel sheets laminated for forming the stator core 21.

Referring back to FIG. 1, the front and rear housings 3 and 4 are fixed, by means of a plurality of bolts, to each other with the stator core 21 retained therebetween. Moreover, the front and rear housings 3 and 4 rotatably support a rotating shaft 11 of the rotor 1 via a pair of bearings.

The pulley 5 is mounted on a front end portion of the rotating shaft 11 of the rotor 1, so that torque generated by an internal combustion engine of the vehicle can be transmitted to the rotor 1 via the pulley 5, thereby driving the rotor 1.

The slip rings 6 are both provided on a rear end portion of the rotating shaft 11 of the rotor 1, and respectively connected to opposite ends of a field coil 14 of the rotor 1.

The brush assembly 7 is provided to supply field current to the field coil 14 during rotation of the rotor 1. The brush assembly 7 includes a pair of brushes that are respectively spring-loaded on the slip rings 6 so as to establish sliding contact with them during rotation of the rotor 1.

The rectifier 8 is configured to full-wave rectify three-phase AC power outputted from the three-phase stator coil 22 of the stator 2 into DC power. In addition, part of the DC power is used as the field current to energize the field coil 14 of the rotor 1.

The voltage regulator 9 is configured to regulate the output voltage of the alternator 100 by controlling the field current supplied to the field coil 14.

The rear cover 10 covers, from the rear side of the alternator 100, all of the brush assembly 7, the rectifier 8 and the voltage regulator 9, thereby protecting them from foreign matter.

The rotor 1 includes a pair of Lundell-type pole cores 12 and 13 in addition to the rotating shaft 11 and the field coil 14. The pole core 12 is located on the front side (i.e., the pulley side), while the pole core 13 is located on the rear side (i.e., the non-pulley side). Both the pole cores 12 and 13 are fixed on the rotating shaft 11 so as to rotate together with the rotating shaft 11. The field coil 14 is provided to magnetize both the pole cores 12 and 13.

More specifically, the pole core 12 includes a cylindrical boss portion 121, a disc portion 122, and a plurality of magnetic pole claws 123. The boss portion 121 is fixedly fitted on the rotating shaft 11. The disc portion 122 extends radially outward from a front part of the boss portion 121. Each of the magnetic pole claws 123 extends axially backward from a radially outer part of the disc portion 122.

Similarly, the pole core 13 includes a cylindrical boss portion 131, a disc portion 132, and a plurality of magnetic pole claws 133. The boss portion 131 is fixedly fitted on the rotating shaft 11. The disc portion 132 extends radially outward from a rear part of the boss portion 131. Each of the magnetic pole claws 133 extends axially forward from a radially outer part of the disc portion 132.

The pole cores 12 and 13 are so arranged that a rear end face of the boss portion 121 of the pole core 12 abuts a front end face of the boss portion 131 of the pole core 13. The field coil 14 is wound around both the boss portions 121 and 131, so as to be surrounded by the pole cores 12 and 13. Moreover, the magnetic pole claws 123 of the pole core 12 are interleaved with the magnetic pole claws 133 of the pole core 13. Consequently, the magnetic pole claws 123 are arranged alternately with the magnetic pole claws 133 in the circumferential direction of the rotating shaft 11. In addition, both the pole cores 12 and 13 are made of a soft magnetic material.

Next, the configuration of the magnetic pole claws 123 and 133 of the pole cores 12 and 13 according to the present embodiment will be described in detail with reference to FIGS. 3 and 4.

In the present embodiment, each of the magnetic pole claws 123 of the pole core 12 has a root portion 123a that adjoins the disc portion 122 of the pole core 12 and a distal end 123b that is furthest from the disc portion 122 in the magnetic pole claw 123.

Further, each of the magnetic pole claws 123 is configured to have a constant circumferential width at the root portion 123a and taper from the root portion 123a to the distal end 123b. In other words, the circumferential width (i.e., the width in the circumferential to direction of the rotating shaft 11) of each of the magnetic pole claws 123 is gradually decreased from the root portion 123a to the distal end 123b.

Similarly, each of the magnetic pole claws 133 of the pole core 13 has a root portion 133a that adjoins the disc portion 132 of the pole core 13 and a distal end 133b that is furthest from the disc portion 132 in the magnetic pole claw 133. Further, each of the magnetic pole claws 133 is configured to have a constant circumferential width at the root portion 133a and taper from the root portion 133a to the distal end 133b. In other words, the circumferential width of each of the magnetic pole claws 133 is gradually decreased from the root portion 133a to the distal end 133b.

Figure 3:
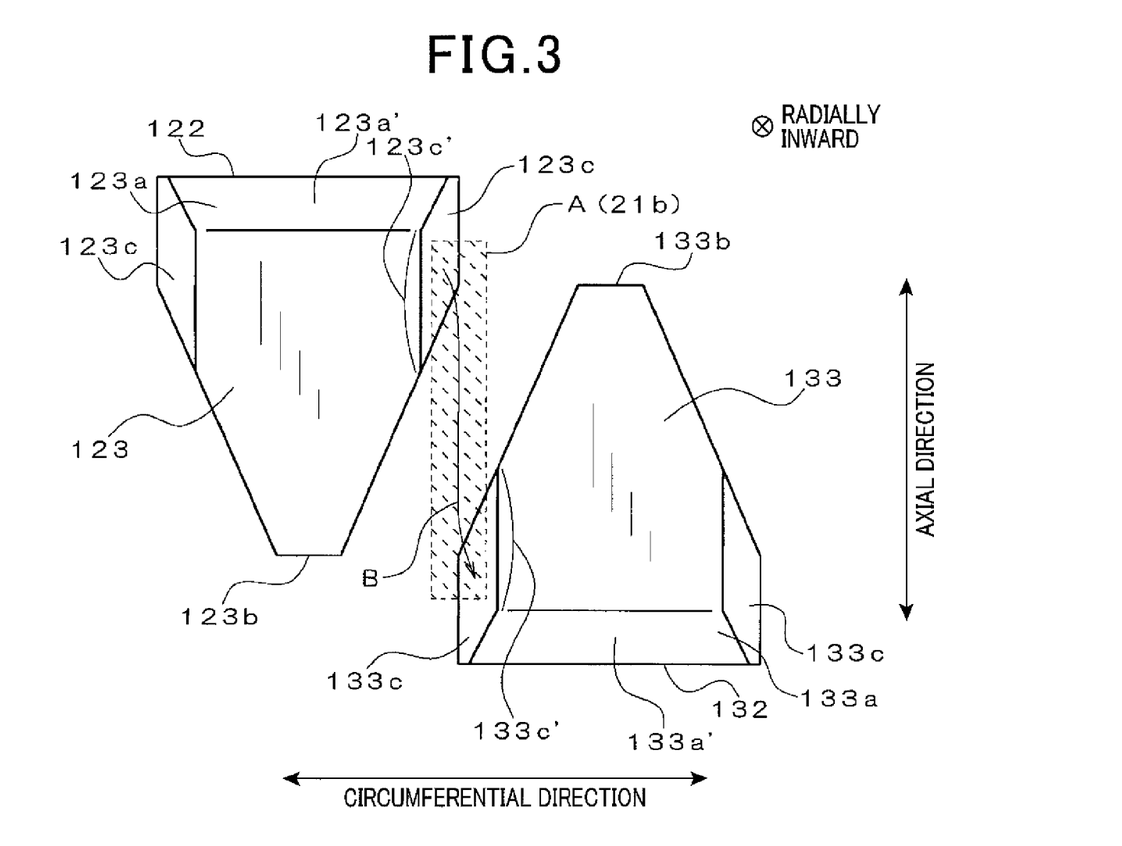
FIG. 3 is a developed side view illustrating the configuration of magnetic pole claws of the rotor.

Moreover, for each circumferentially-adjacent pair of the magnetic pole claws 123 and 133 of the pole cores 12 and 13, when one of the teeth 21b of the stator core 21 is present at a relative position A to the pair of the magnetic pole claws 123 and 133 as shown in FIG. 3, the tooth 21b radially overlaps the pair of the magnetic pole claws 123 and 133 to have a maximum overlapping area therebetween. Further, at the relative position A, the overlapping area between the tooth 21b and the magnetic pole claw 123 is equal to that between the tooth 21b and the magnetic pole claw 133.

Furthermore, in the present embodiment, the axial length of the teeth 21b of the stator core 21 is set to be greater than the axial length of the gap between the adjacent magnetic pole claws 123 and 133. Consequently, as shown in FIG. 3, at the relative position A, the tooth 21b of the stator core 21 has its axial end portions respectively radially overlapping the root portions 123a and 133a of the magnetic pole claws 122 and 133.

Figure 4:
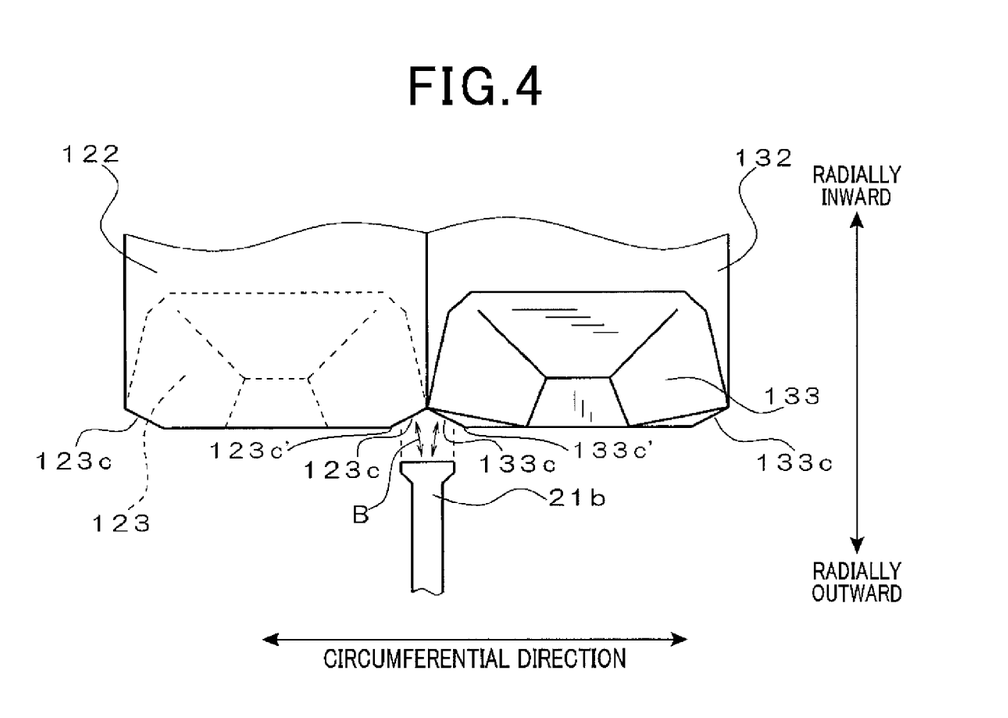
FIG. 4 is a developed plan view of two adjacent magnetic pole claws of the rotor and one tooth of the stator core.

Moreover, in the present embodiment, as shown in FIGS. 3 and 4, for each circumferentially-adjacent pair of the magnetic pole claws 123 and 133 of the pole cores 12 and 13, the magnetic pole claw 123 has a chamfered portion 123c formed at a circumferential end of the root portion 123a on the magnetic pole claw 133 side so as to extend parallel to the axial direction of the rotating shaft 11. Further, the chamfered portion 123c is formed so that when one of the teeth 21b of the stator core 21 is present at the relative position A, the air gap between the chamfered portion 123c and the tooth 21b of the stator core 21 increases in the circumferential direction from the boundary 123c' between the chamfered portion 123c and the radially outer surface of the magnetic pole claw 123 to the circumferential end of the root portion 123a of the magnetic pole claw 123. Furthermore, the boundary 123c' between the chamfered portion 123c and the radially outer surface of the magnetic pole claw 123 is circumferentially located apart from the tooth 21b (or the relative position A).

Similarly, the magnetic pole claw 133 has a chamfered portion 133c formed at a circumferential end of the root portion 133a on the magnetic pole claw 123 side so as to extend parallel to the axial direction of the rotating shaft 11. Further, the chamfered portion 133c is formed so that when one of the teeth 21b of the stator core 21 is present at the relative position A, the air gap between the chamfered portion 133c and the tooth 21b of the stator core 21 increases in the circumferential direction from the boundary 133c' between the chamfered portion 133c and the radially outer surface of the magnetic pole claw 133 to the circumferential end of the root portion 133a of the magnetic pole claw 133. Furthermore, the boundary 133c' between the chamfered portion 133c and the radially outer surface of the magnetic pole claw 133 is circumferentially located apart from the tooth 21b (or the relative position A).

With the above configuration of the chamfered portions 123c and 133c of the magnetic pole claws 123 and 133, it is possible to reliably reduce leakage magnetic flux that flows, as indicated by arrows B in FIGS. 3 and 4, between the magnetic pole claws 123 and 133 via the tooth 21b of the stator core 21.

Moreover, since the chamfered portions 123c and 133c extend parallel to the axial direction of the rotating shaft 11, the air gaps between the magnetic pole claws 12 and 13 and the tooth 21b of the stator core 21 are largest at the circumferential ends of the root portions 123a and 133a of the magnetic pole claws 12 and 13. Further, the air gaps between the magnetic pole claws 12 and 13 and the tooth 21b of the stator core 21 at the circumferential ends of the root portions 123a and 133a are constant in the axial direction of the rotating shaft 11. Therefore, it is possible to set the air gaps between the magnetic pole claws 12 and 13 and the tooth 21b of the stator core 21 at the circumferential ends of the root portions 123a and 133a to a necessary minimum for reducing the above-described leakage magnetic flux, thereby preventing the air gaps at other portions of the magnetic pole claws 12 and 13 from becoming excessively large. Consequently, it is possible to prevent is the effective magnetic flux in the alternator 100 from being reduced, thereby securing a high output of the alternator 100.

In addition, as shown in FIG. 3, both the boundary 123c' between the chamfered portion 123c and the radially outer surface of the magnetic pole claw 123 and the boundary 133c' between the chamfered portion 133c and the radially outer surface of the magnetic pole claw 133 extend parallel to the circumferential ends of the tooth 21b of the stator core 21. Moreover, each of the boundaries 123c' and 133c' extends in the axial direction of the rotating shaft 11 outward of a corresponding one of axial end faces of the tooth 21b. However, in cases where slants 123a' and 133a' formed at axial ends of the root portions 123a and 133a of the magnetic pole claws 123 and 133 are large, each of the boundaries 123c' and 133c' may be located entirely inside the corresponding axial end face of the tooth 21b in the axial direction of the rotating shaft 11.

The above-described rotor 1 according to the present embodiment has the following advantages.

In the present embodiment, the rotor 1 includes the rotating shaft 11 and the front and rear pole cores 12 and 13 fixed on the rotating shaft 11. The pole core 12 includes the magnetic pole claws 123, each of which is configured to have the constant circumferential width at the root portion 123a and taper from the root portion 123a to the distal end 123b. The pole core 13 includes the magnetic pole claws 133, each of which is configured to have the constant circumferential width at the root portion 133a and taper from the root portion 133a to the distal end 133b. The magnetic pole claws 123 of the pole core 12 are arranged alternately with the magnetic pole claws 133 of the pole core 13 in the circumferential direction of the rotating shaft 11. Each of the magnetic pole claws 123 of the pole core 12 has the pair of chamfered portions 123c formed respectively at opposite circumferential ends of the root portion 123a of the magnetic pole claw 123 so as to extend parallel to the axial direction of the rotating shaft 11. Each of the magnetic pole claws 133 of the pole core 13 has the pair of chamfered portions 133c formed respectively at opposite circumferential ends of the root portion 133a of the magnetic pole claw 133 so as to extend parallel to the axial direction of the rotating shaft 11.

With the above configuration, it is possible to increase the air gaps between the magnetic pole claws 123 and 133 of the pole cores 12 and 13 and the teeth 21b of the stator core 21 at those areas where leakage magnetic flux occurs, thereby reducing the leakage magnetic flux. At the same, it is also possible to suppress increase in the air gaps between the magnetic pole claws 123 and 133 of the pole cores 12 and 13 and the teeth 21b of the stator core 21 at the other areas, thereby preventing the effective magnetic flux in the alternator 100 from being reduced. As a result, it is possible to secure a high output of the alternator 100.

Moreover, with the above configuration, even when the axial length of the stator core 21 is increased, it is still possible to reduce the leakage magnetic flux while preventing the effective magnetic flux from being reduced. Therefore, it is possible to meet a plurality of required outputs of the alternator 100 only by increasing the axial length of the stator core 21, more specifically by increasing the number of the steel sheets laminated for forming the stator core 21. Consequently, it is possible to suppress increase in the manufacturing cost of the alternator 100.

In the present embodiment, the chamfered portions 123c and 133c of the magnetic pole claws 123 and 133 of the pole cores 12 and 13 are formed so that when one of the teeth 21b of the stator core 21 is at the relative position A to circumferentially-adjacent two of the magnetic pole claws 123 and 133 of the pole cores 12 and 13, for each of the two magnetic pole claws 123 and 133, the air gap formed between the chamfered portion of the magnetic pole claw and the tooth 21b of the stator core 21 increases in the circumferential direction toward the circumferential end of the root portion of the magnetic pole claw.

With the above formation of the chamfered portions 123c and 133c of the magnetic pole claws 123 and 133, it is possible to reliably reduce leakage magnetic flux that flows between each circumferentially-adjacent pair of the magnetic pole claws 123 and 133 via the teeth 21b of the stator core 21.

Further, in the present embodiment, at the relative position A, for each of the two circumferentially-adjacent magnetic pole claws 123 and 133, the boundary 123c' or 133c' between the chamfered portion of the magnetic pole claw and the radially outer surface of the magnetic pole claw is circumferentially located apart from the tooth 21b of the stator core 21.

With the above configuration, it is possible to minimize the leakage magnetic flux that flows between the two circumferentially-adjacent magnetic pole claws 123 and 133 via the tooth 21b of the stator core 21.

In the present embodiment, each of the magnetic pole claws 123 and 133 of the pole cores 12 and 13 has the pair of chamfered portions 123c or 133c formed respectively at opposite circumferential ends of the root portion of the magnetic pole claw.

Consequently, compared to the case of each of the magnetic pole claws 123 and 133 having only one chamfered portion 123c or 133c formed at one circumferential end of the root portion, it is possible to more effectively reduce leakage magnetic flux that flows between each circumferentially-adjacent pair of the magnetic pole claws 123 and 133 via the teeth 21b of the stator core 21.

In the present embodiment, all of the chamfered portions 123c and 133c of the magnetic pole claws 123 and 133 of the pole cores 12 and 13 are each made up of a single flat surface (see FIG. 4).

Consequently, it is possible to cause the air gaps between the magnetic pole claws 123 and 133 and the teeth 21b of the stator core 21 to be rapidly increased at the chamfered portions 123c and 133c, thereby effectively reducing leakage magnetic flux that flows between each circumferentially-adjacent pair of the magnetic pole claws 123 and 133 via the teeth 21b of the stator core 21.

While the above particular embodiment has been shown and described, it will be understood by those skilled in the art that various modifications, changes, and improvements may be made without departing from the spirit of the invention.

For example, in the previous embodiment, all of the chamfered portions 123c and 133c of the magnetic pole claws 123 and 133 of the pole cores 12 and 13 are each made up of a single flat surface.

Figure 5:
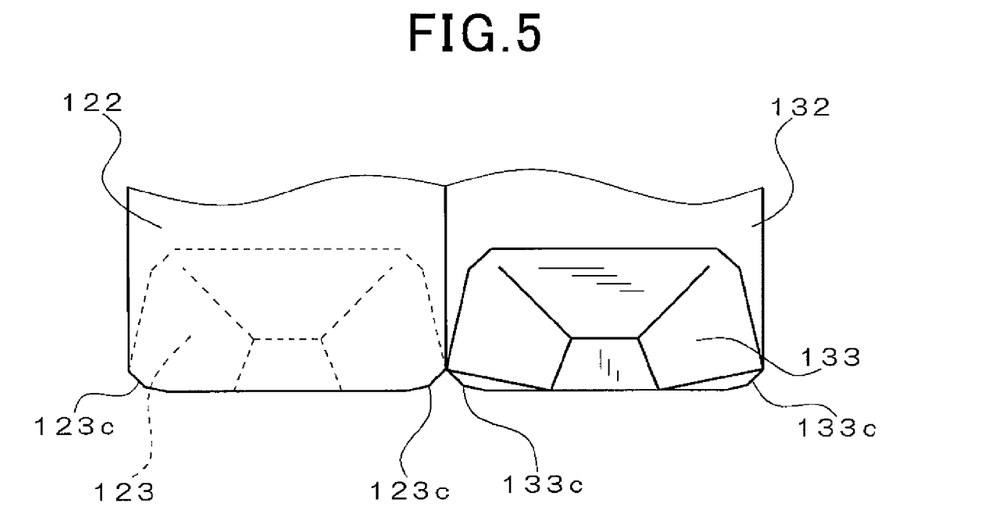
FIG. 5 is a developed plan view illustrating the configuration of magnetic pole claws according to a first modification.
Figure 6:
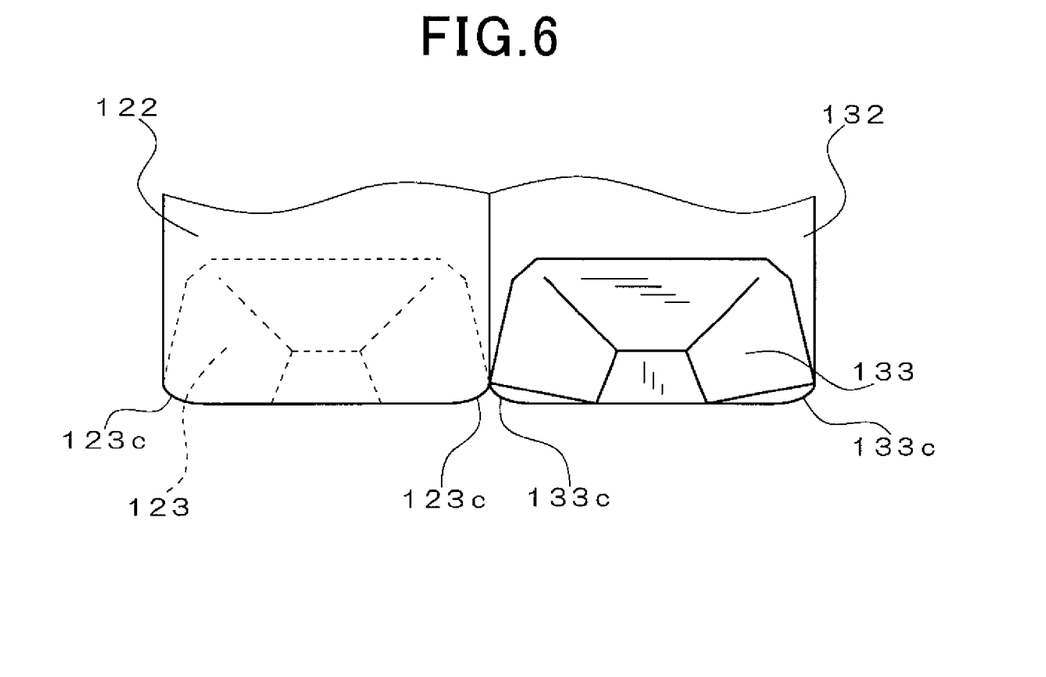
FIG. 6 is a developed plan view illustrating the configuration of magnetic pole claws according to a second modification.

However, all of the chamfered portions 123c and 133c of the magnetic pole claws 123 and 133 of the pole cores 12 and 13 may be each made up of two or more flat surfaces as shown in FIG. 5. Otherwise, all of the chamfered portions 123c and 133c of the magnetic pole claws 123 and 133 of the pole cores 12 and 13 may be each made up of a curved surface as shown in FIG. 6. In each of those cases, it is possible to reduce wind noise caused by the chamfered portions 123c and 133c during rotation of the rotor 1 in comparison with the case of the chamfered portions 123c and 133c being each made up of a single flat surface.

Moreover, it is also possible that only part of the chamfered portions 123c and 133c of the magnetic pole claws 123 and 133 of the pole cores 12 and 13 are each made up of a single flat surface as shown in FIG. 4 while the remaining chamfered portions 123c and 133c are each made up of two or more flat surfaces as shown in FIG. 5 or a curved surface as shown in FIG. 6.

In the previous embodiment, each of the magnetic pole claws 123 and 133 of the pole cores 12 and 13 has the pair of chamfered portions 123c or 133c formed respectively at opposite circumferential ends of the root portion of the magnetic pole claw (see FIG. 4).

Figure 7:
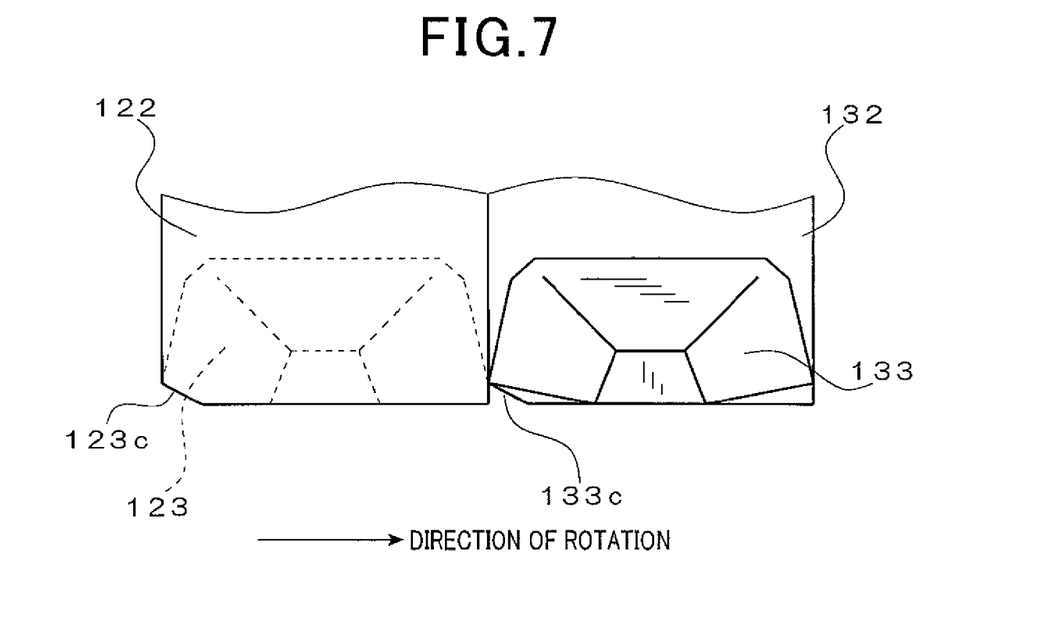
FIG. 7 is a developed plan view illustrating the configuration of magnetic pole claws according to a third modification.
Figure 8:
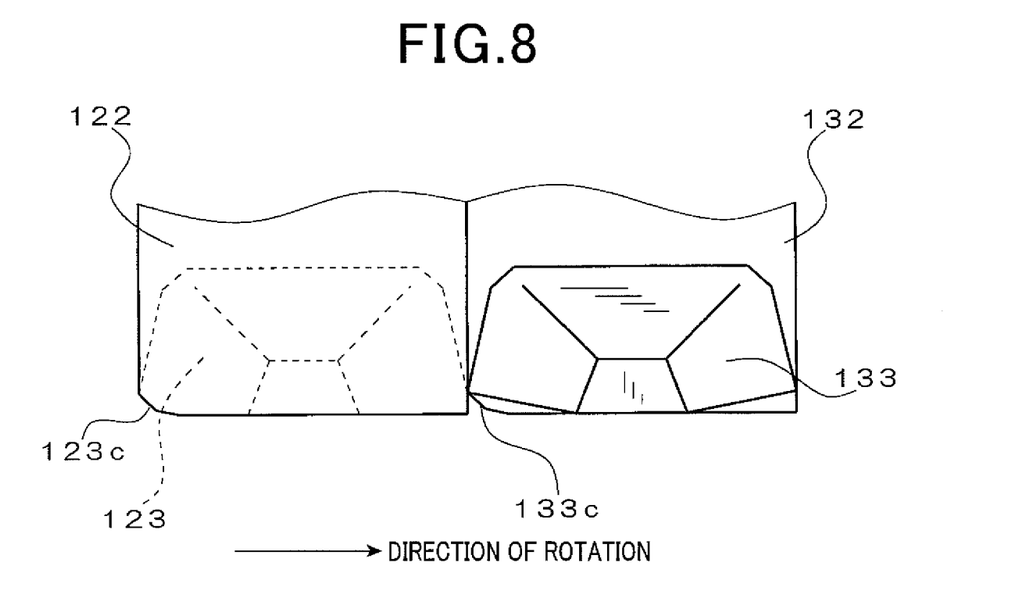
FIG. 8 is a developed plan view illustrating the configuration of magnetic pole claws according to a fourth modification.
Figure 9:
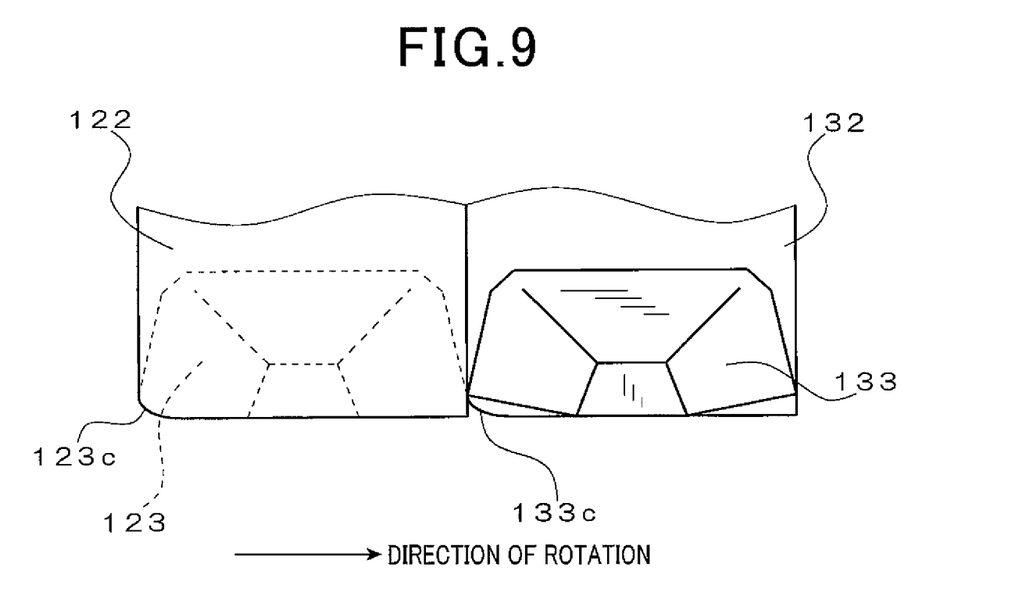
FIG. 9 is a developed plan view illustrating the configuration of magnetic pole claws according to a fifth modification.

However, as shown in FIGS. 7-9, each of the magnetic pole claws 123 and 133 of the pole cores 12 and 13 may have only one chamfered portion 123c or 133c formed at that one of opposite circumferential ends of the root portion of the magnetic pole core which is located on the rear side of the other circumferential end in the direction of rotation of the rotor 1. Further, for each of the magnetic pole claws 123 and 133, the only chamfered portion 123c or 133c of the magnetic pole claw may be made up of either a single flat surface as shown in FIG. 7, two or more flat surfaces as shown in FIG. 8 or a curved surface as shown in FIG. 9. In each of those cases, it is possible to eliminate wind noise that would be otherwise caused by the chamfered portions 123c and 133c formed at those circumferential ends of the root portions of the magnetic pole cores 123 and 133 which are located on the front side in the direction of rotation of the rotor 1.

Figure 10:
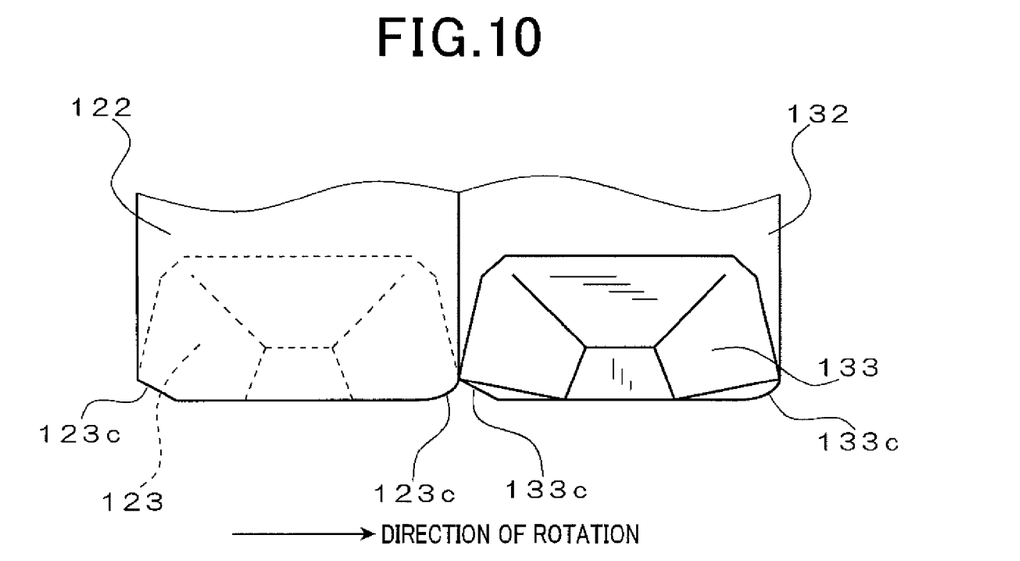
FIG. 10 is a developed plan view illustrating the configuration of magnetic pole claws according to a sixth modification.
Figure 11:
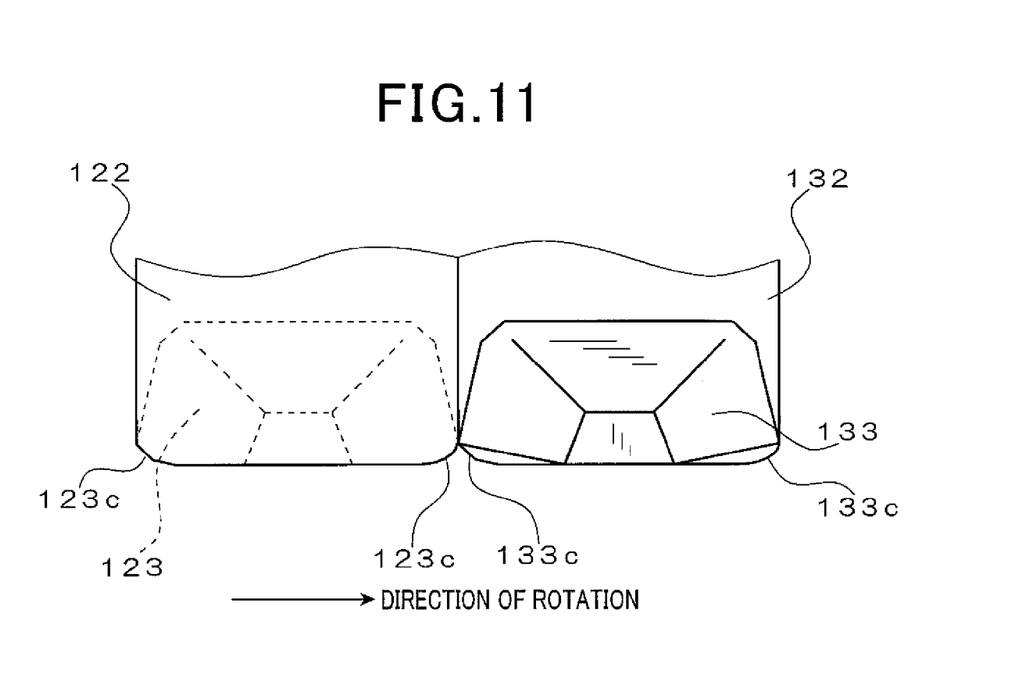
FIG. 11 is a developed plan view illustrating the configuration of magnetic pole claws according to a seventh modification.

Furthermore, as shown in FIG. 10, each of the magnetic pole claws 123 and 133 of the pole cores 12 and 13 may have one chamfered portion 123c or 133c made up of a single flat surface at the circumferential end of the root portion of the magnetic pole claw on the rear side and another chamfered portion 123c or 133c made up of a curved surface at the circumferential end of the root portion on the front side in the direction of rotation of the rotor 1. Otherwise, as shown in FIG. 11, each of the magnetic pole claws 123 and 133 of the pole cores 12 and 13 may have one chamfered portion 123c or 133c made up of two or more flat surfaces at the circumferential end of the root portion of the magnetic pole claw on the rear side and another chamfered portion 123c or 133c made up of a curved surface at the circumferential end of the root portion on the front side in the direction of rotation of the rotor 1. In each of those cases, it is possible to reduce leakage magnetic flux that flows between each circumferentially-adjacent pair of the magnetic pole claws 123 and 133 via the teeth 21b of the stator core 21 while reducing wind noise caused by the chamfered portions 123c and 133c of the magnetic pole claws 123 and 133 during rotation of the rotor 1.

In the previous embodiment, all of the magnetic pole claws 123 and 133 of the pole cores 12 and 13 each have the pair of chamfered portions 123c or 133c formed respectively at opposite circumferential ends of the root portion of the magnetic pole claw.

However, it is also possible that only part of the magnetic pole claws 123 and 133 of the pole cores 12 and 13 each have at least one chamfered portion 123c or 133c formed at a circumferential end of the root portion of the magnetic pole claw while the remaining magnetic pole claws 123 and 133 each have no chamfered portion formed at a circumferential end of the root portion of the magnetic pole claw.

What is claimed is:

1. A rotor for an automotive alternator, the rotor comprising:
   a rotating shaft; and
   a pair of first and second pole cores fixed on the rotating shaft, each of the first and second pole cores including a plurality of magnetic pole claws, each of the magnetic pole claws having a root portion and a distal end, each of the magnetic pole claws being configured to have a constant circumferential width at the root portion and taper from the root portion to the distal end, the magnetic pole claws of the first pole core being arranged alternately with the magnetic pole claws of the second pole core in a circumferential direction of the rotating shaft,
   wherein
   at least part of the magnetic pole claws of the first and second pole cores each have at least one chamfered portion formed at a circumferential end of the root portion of the magnetic pole claw so as to extend parallel to an axial direction of the rotating shaft, and
   at least part of the chamfered portions of the magnetic pole claws of the first and second pole cores are each made up of a curved surface.

2. The rotor as set forth in claim 1, wherein the alternator includes an annular stator core to be disposed radially outside of the rotor, the stator core having a plurality of teeth arranged in a circumferential direction of the stator core at predetermined intervals,
   the at least one chamfered portion includes a pair of chamfered portions formed respectively at opposite circumferential ends of the root portion of the magnetic pole claw so as to extend parallel to the axial direction of the rotating shaft, and
   the chamfered portions of the magnetic pole claws of the first and second pole cores are formed so that when one of the teeth of the stator core is at a predetermined relative position to circumferentially-adjacent two of the magnetic pole claws of the first and second pole cores, for each of the two magnetic pole claws, an air gap formed between the chamfered portion of the magnetic pole claw and the tooth of the stator core increases in the circumferential direction toward the circumferential end of the root portion of the magnetic pole claw, the predetermined relative position being such a relative position where the tooth of the stator core radially overlaps the two circumferentially-adjacent magnetic pole claws to have a maximum overlapping area therebetween.

3. The rotor as set forth in claim 2, wherein at the predetermined relative position, the overlapping area between the tooth of the stator core and one of the two circumferentially-adjacent magnetic pole claws is equal to the overlapping area between the tooth and the other magnetic pole claw.

4. The rotor as set forth in claim 2, wherein at the predetermined relative position, for each of the two circumferentially-adjacent magnetic pole claws, a boundary between the chamfered portion of the magnetic pole claw and a radially outer surface of the magnetic pole claw is circumferentially located apart from the tooth of the stator core.

5. The rotor as set forth in claim 1, wherein the at least part of the magnetic pole claws of the first and second pole cores each have only one chamfered portion formed at one of two opposite circumferential ends of the root portion of the magnetic pole claw, the one circumferential end located on a rear side of the other circumferential end in the direction of rotation of the rotor.

6. The rotor as set forth in claim 1, wherein the at least part of the magnetic pole claws of the first and second pole cores each have a pair of chamfered portions formed respectively at opposite circumferential ends of the root portion of the magnetic pole claw.

7. The rotor as set forth in claim 6, wherein for each of the at least part of the magnetic pole claws of the first and second pole cores, the chamfered portion formed at the circumferential end of the root portion of the magnetic pole claw on a front side in the direction of rotation of the alternator is made up of a curved surface, and the chamfered portion formed at the circumferential end of the root portion on a rear side in the direction of rotation is made up of a single flat surface or a plurality of flat surfaces.

8. The rotor as set forth in claim 1, wherein each of the chamfered portions of the magnetic pole claws of the first and second pole cores is formed so that a boundary between the chamfered portion and a radially outer surface of the magnetic pole claw extends parallel to the axial direction of the rotating shaft.

* * * * *